(12) United States Patent
K M et al.

(10) Patent No.: US 12,413,664 B2
(45) Date of Patent: Sep. 9, 2025

(54) IDENTIFICATION AND PREVENTION OF SENSITIVE INFORMATION EXPOSURE IN TELEPHONIC CONVERSATIONS

(71) Applicant: International Business Machines Corporation, Armonk, NY (US)

(72) Inventors: Manu K M, Bangalore (IN); Balaji Sankar Kumar, Bangalore (IN); Vidya Chandrashekar, Bangalore (IN); vamshi dondapati, Hyderabad (IN); Arun Aravind, Mahe (IN); Akshat Dixit, Lucknow (IN); Arun Sabaresh Anantha Narayanan, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 56 days.

(21) Appl. No.: 18/223,815

(22) Filed: Jul. 19, 2023

(65) Prior Publication Data
US 2025/0030795 A1 Jan. 23, 2025

(51) Int. Cl.
*H04M 3/22* (2006.01)
*G10L 15/18* (2013.01)
(Continued)

(52) U.S. Cl.
CPC ....... *H04M 3/2281* (2013.01); *G10L 15/1815* (2013.01); *H04L 9/088* (2013.01);
(Continued)

(58) Field of Classification Search
CPC ............. H04M 3/2281; H04M 3/2218; H04M 2201/40; G10L 15/1815; H04L 9/088; H04L 9/30
See application file for complete search history.

(56) References Cited

U.S. PATENT DOCUMENTS 8,706,486 B1 4/2014 Devarajan et al.
9,443,005 B2 9/2016 Khandekar
(Continued)

FOREIGN PATENT DOCUMENTS

CN 111740951 A 10/2020
TW 202307644 A 2/2023
(Continued)

OTHER PUBLICATIONS

Petracca et al., AuDroid: Preventing Attacks on Audio Channels in Mobile Devices, Apr. 1, 2016.
(Continued)

*Primary Examiner* — Akelaw Teshale
(74) *Attorney, Agent, or Firm* — Garg Law Firm, PLLC; Rakesh Garg; Jared Chaney

(57) ABSTRACT

An embodiment converts, by a voice-to-text converter, voice data to text data. The embodiment extracts, by an extractor, an intent and an entity from the text data. The embodiment predicts, by a predictor, based on the intent and the entity, a sensitive information. The embodiment compares, by an intersector, the text data to the predicted sensitive information. The embodiment determines, by the intersector, responsive to the comparing, whether the text data includes the predicted sensitive information. The embodiment intersects, by the intersector, responsive to a determination that the text data includes the predicted sensitive information, the voice data.

20 Claims, 6 Drawing Sheets

(51) Int. Cl.
*H04L 9/08* (2006.01)
*H04L 9/30* (2006.01)

(52) U.S. Cl.
CPC ............ *H04L 9/30* (2013.01); *H04M 3/2218* (2013.01); *H04M 2201/40* (2013.01)

(56) References Cited

U.S. PATENT DOCUMENTS

| | | |
|---|---|---|
| 10,469,663 B2 | 11/2019 | Milstein et al. |
| 10,747,894 B1* | 8/2020 | Cline ...................... G06F 40/35 |
| 10,778,839 B1 | 9/2020 | Newstadt et al. |
| 11,423,018 B1* | 8/2022 | Paiz ...................... G06F 16/243 |
| 11,755,756 B1* | 9/2023 | Cline .................. G06F 21/6254 704/200 |
| 2009/0254971 A1* | 10/2009 | Herz ...................... G06Q 10/10 726/1 |
| 2013/0266127 A1 | 10/2013 | Schachter et al. |
| 2016/0219024 A1 | 7/2016 | Verzun et al. |
| 2019/0026494 A1* | 1/2019 | Smith .................. G06F 21/6254 |
| 2021/0241607 A1 | 8/2021 | Rhoads et al. |
| 2022/0122628 A1 | 4/2022 | McCloskey et al. |
| 2022/0164472 A1* | 5/2022 | Cannon ............... G06F 21/6245 |
| 2022/0350825 A1* | 11/2022 | van de Nieuwegiessen ................ G06F 40/35 |
| 2022/0366904 A1 | 11/2022 | Martinson et al. |
| 2022/0399009 A1 | 12/2022 | Okada et al. |

FOREIGN PATENT DOCUMENTS

| | | |
|---|---|---|
| TW | 202509910 A | 3/2025 |
| WO | 2020/117504 A1 | 6/2020 |

OTHER PUBLICATIONS ip.com, Flexible and Effective Method for Sensitive Information Detection for Both Structured and Unstructured Data Using Two Pipelined Models, Jan. 10, 2023.
ip.com, Detection and Warning System For Sensitive Information Revealed During Phone Calls, Aug. 19, 2020.
Taiwan Patent Office, "First Office Action," Apr. 10, 2025, 16 Pages, TW Application No. 113126517.

* cited by examiner

IDENTIFICATION AND PREVENTION OF SENSITIVE INFORMATION EXPOSURE IN TELEPHONIC CONVERSATIONS

BACKGROUND

The present invention relates generally to sensitive information exposure. More particularly, the present invention relates to a method, system, and computer program for identification and prevention of sensitive information exposure in telephonic conversations.

Voice phishing, also known as "vishing," is a malicious activity wherein a fraudster manipulates a victim into disclosing their sensitive information over the phone. This deceptive practice, built on social engineering techniques, often utilizes caller identification spoofing or artificial intelligence-based voice technology to impersonate a trustworthy entity. The fraudster may pose as a bank representative, tech support, or a government official to gain the victim's trust, thereby coaxing them into revealing their personal identifiable information, which may include social security numbers, credit card details, and bank account details.

Moreover, while many people are aware of the potential dangers of sharing sensitive information, unintentional disclosure of such information is still a significant concern. This often occurs in the context of ambiguous or complex conversations where an individual might unknowingly disclose too much information. Such conversations are particularly prevalent in customer support environments, where the customer might divulge certain information without realizing its potential misuse. The inadvertent sharing of sensitive information can lead to severe consequences, such as identity theft or financial loss.

SUMMARY

The illustrative embodiments provide for identification and prevention of sensitive information exposure in telephonic conversations.

An embodiment includes converting, by a voice-to-text converter, voice data to text data. This step facilitates the conversion of audio input into a text format, thereby enabling subsequent automated processes such as natural language processing and information extraction. This process is technically advantageous as it allows real-time conversion of voice data, enhancing the speed and accuracy.

The embodiment also includes extracting, by an extractor, an intent and an entity from the text data. The extractor is designed to discern the meaning or purpose (intent) and subject matter (entity) of the user's speech. This capability provides a clear advantage by enabling the system to understand the context of the conversation, which is helpful in identifying potential sensitive information exposure.

The embodiment also includes predicting, by a predictor, based on the intent and the entity, sensitive information. This step involves assessing whether the intent and entity, in the given context, potentially lead to the disclosure of sensitive information. The technical advantage lies in the predictive capability of the system, which not only reacts to actual instances of sensitive information exposure but also anticipates potential instances, enhancing the preventive measures.

The embodiment also includes comparing, by an intersector, the text data to the predicted sensitive information. This comparison involves scanning the text data and matching it against the predicted sensitive information, facilitating the immediate detection of sensitive data. This stage provides the technical advantage of swift and precise detection of sensitive information, ensuring efficient data protection.

The embodiment also includes determining, by the intersector, responsive to the comparing, whether the text data includes the predicted sensitive information. This stage, based on the result of the comparison, decides whether the text data contains sensitive information. The advantage lies in its decision-making capability, which empowers the system to make informed actions towards data protection.

The embodiment also includes intersecting, by the intersector, responsive to a determination that the text data includes the predicted sensitive information, the voice data. This stage involves halting the transmission of voice data if sensitive information is detected. The clear advantage of this stage is the immediate prevention of sensitive data transmission, acting as a fail-safe against privacy exposures.

The entire process serves as an automated mechanism for preventing sensitive information exposure in real-time during telephonic conversations. The automation of sensitive information detection and prevention relieves users from the burden of constant vigilance during their telephonic conversations. Furthermore, the real-time operation ensures immediate response to potential data breaches, significantly reducing the risk of sensitive information exposure. Overall, this process constitutes a robust, dynamic, and automated safeguard for sensitive information during telephonic communications.

An embodiment includes where the voice data is associated with a speaker of a telephonic conversation, further including intersecting the voice data by preventing a transmission of the voice data to a listener in the telephonic conversation. This step offers a critical technical advantage by enabling real-time interception of voice data during a call, thereby preventing the unintended sharing of sensitive information.

An embodiment includes retrieving a key-value pair, a key corresponding to an identifier associated with the sensitive information, and a value corresponding to the sensitive information; and predicting the sensitive information by determining whether the text data matches at least one of the key or the value. This technique benefits from the structured storage of sensitive information as key-value pairs. This provides a precise way of predicting potential sensitive information exposure by matching current conversation data with known sensitive data, enhancing the accuracy and speed of the system's response.

An embodiment includes decomposing the predicted sensitive information into a key-value pair; and storing the key-value pair. This stage has the technical advantage of converting detected sensitive information into a structured format and storing it for future reference.

An embodiment includes generating a sensitive information warning. This feature provides real-time alerts to users when potential sensitive information exposure is detected, enhancing the system's proactive data protection measures and offering users an opportunity to modify their conversation.

An embodiment includes generating a speaker agreement. This step brings a layer of user consent into the process, allowing users to confirm or deny their intent to share sensitive information. This feature enhances user control and ensures that data protection measures align with the user's intentions.

An embodiment includes determining a risk score associated with a telephonic conversation; and generating a risk warning, responsive to a determination that the risk score meets a predetermined threshold. This embodiment provides a comprehensive assessment of the potential risk associated with a call, offering a quantifiable metric to gauge data exposure risks. The subsequent risk warning further bolsters the system's preventive measures, alerting users to high-risk situations.

An embodiment includes where the risk score is based on at least one of a call history, a call frequency, and a call time. By considering various factors, this method ensures a holistic evaluation of risk, leading to a more accurate risk score. This multi-faceted approach to risk assessment enhances the system's ability to detect potential threats.

An embodiment includes deactivating, responsive to a user selection, at least one of the voice-to-text converter, the extractor, the predictor, and the intersector. This feature allows users to control the operation of the system, providing an added level of customization and control to the user.

In summary, the technical effect of the entire process is a comprehensive, real-time, user-centric system that protects sensitive information during telephonic conversations. The system proactively detects, alerts, and prevents potential data exposure, providing enhanced data security. The culmination of these technical advantages results in an effective solution for safeguarding sensitive information during telephonic communication.

A combination of the embodiments involves the conversion of voice data to text data, extraction of intent and entity, prediction of sensitive information based on the intent and entity, and comparison of the text data to the predicted sensitive information. Upon determining that the text data includes predicted sensitive information, the system intersects the voice data and prevents its transmission to a listener in a telephonic conversation. Additionally, a sensitive information warning is generated, and a speaker agreement is elicited. This claim combination captures the core real-time protection mechanism of the invention. The general technical effect of this combination is improved privacy protection during telephonic conversations. It ensures that sensitive information, once identified, is not transmitted to unintended listeners. This preemptive approach significantly improves the efficiency and timeliness of sensitive data protection.

Additionally or alternatively, an embodiment includes retrieving a key-value pair corresponding to sensitive information, predicting sensitive information by matching text data with the key or value, decomposing the predicted sensitive information into a key-value pair, and storing the key-value pair. This embodiment leverages the structured storage of sensitive information and provides a robust prediction mechanism for potential sensitive information exposure. Furthermore, the process of decomposing and storing key-value pairs improves the system's future capability, thereby enhancing its usability over time. The general technical effect of this combination is an enhanced prediction and learning capability of the system for improved sensitive information protection. The specific technical advantage lies in the retrieval, decomposition, and storage of key-value pairs, which allows the system to continually adapt and improve its sensitivity to potential data exposures.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
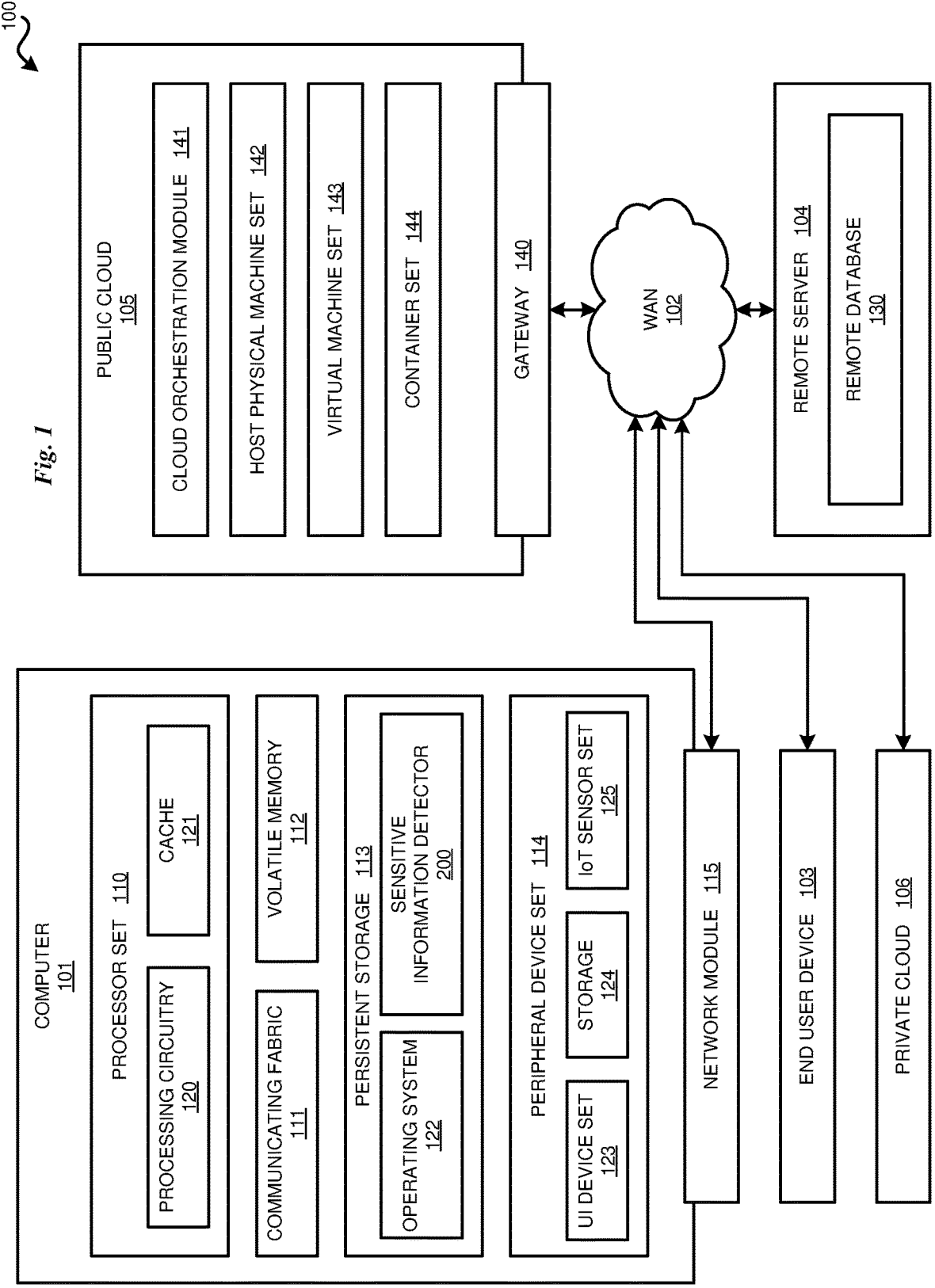
FIG. 1 depicts a block diagram of a computing environment in accordance with an illustrative embodiment.

According to one aspect of the invention, a method implemented on a computer comprises: converting voice data into text data via a voice-to-text converter, extracting an intention and an entity from the text data using an extractor, predicting sensitive information based on the intention and the entity using a predictor, comparing the text data with the predicted sensitive information using an intersector, determining whether the text data includes the predicted sensitive information in response to the comparison using the intersector, and intersecting the voice data in response to a determination that the text data includes the predicted sensitive information, also using the intersector. This method can lead to improved protection of sensitive information during voice data transmission by identifying and preventing the sharing of such information. The system can identify potential sensitive information in voice data and prevent it from being shared, thereby improving the security of voice-based communication.

In some embodiments, the voice data can be associated with a speaker of a telephonic conversation. The method may also include preventing the transmission of the voice data to a listener in the telephonic conversation when intersecting the voice data. This feature has the technical effect of providing real-time prevention of sensitive information transmission during a telephonic conversation, thereby ensuring the protection of such data.

In further embodiments, the method may include retrieving a key corresponding to an identifier associated with the sensitive information, and a value corresponding to the sensitive information. The method can also include predicting the sensitive information by determining whether the text data matches either the key or the value. This aspect can improve the precision of the sensitive information detection process by leveraging key-value pair associations.

In addition, the method may involve decomposing the predicted sensitive information into a key-value pair and storing the key-value pair. This feature allows for the convenient tracking and management of identified sensitive information, providing a more streamlined approach to handle such data.

In some embodiments, the method can include generating a sensitive information warning. This feature ensures that the user is informed whenever there is a potential risk of sensitive information being shared, enhancing the user's awareness and control over their data.

Further, the method may involve generating a speaker agreement. This feature empowers the user to make informed decisions regarding the sharing of potentially sensitive information, thereby enhancing user control.

In certain embodiments, the method may include determining a risk score associated with a telephonic conversation and generating a risk warning, responsive to a determination that the risk score meets a predetermined threshold. The risk score could be determined based on factors such as call history, call frequency, and call time. This feature provides an additional layer of protection by assessing the overall risk associated with a call, allowing for proactive measures to be taken to prevent sensitive information disclosure.

In other embodiments, the method may allow the user to deactivate certain components like the voice-to-text converter, the extractor, the predictor, and the intersector. This feature balances the system's security functions with the user's privacy preferences, thereby offering a tailored user experience.

The system might include the features of extracting an intention and an entity from text data, predicting sensitive information, and then intersecting voice data based on this prediction. Additionally, it might implement a risk assessment mechanism and issue warnings based on the assessed risk. This combination of features can offer a comprehensive and effective solution for the protection of sensitive information in voice-based communication, providing both proactive and reactive measures to mitigate potential data exposure risks.

In terms of a technical use case, consider a scenario where a user is discussing their credit card information during a phone call. The system could convert the spoken voice data into text, extract the relevant entities and intentions from this text, and predict potential sensitive information, such as the credit card number. Upon detection of such sensitive information, the system could interrupt the voice data transmission, effectively preventing the user from unintentionally sharing their credit card details. This use case illustrates the practical application and effectiveness of the system in a real-world scenario.

In today's interconnected world, the telephone has become a pivotal tool for communication. Individuals regularly share vast amounts of information over the telephone, discussing everything from personal matters to business deals. However, this open exchange of information has its drawbacks. There are instances where the individual at the other end of the line could pose as a representative of a trustworthy organization, all with the intention to illicitly procure sensitive details. Such duplicitous actors often aim to extract critical data such as credit card PINs, one-time passwords, or other confidential information. As the identity of the person on the other end of the call cannot be confirmed entirely, many unsuspecting individuals become victims of these fraudulent activities.

On the other hand, scenarios exist where a conversation may not be inherently fraudulent, yet could still lead to unintentional disclosure of sensitive information. For instance, a simple misunderstanding could lead to a major privacy breach. When a caller asks for a non-sensitive piece of data such as a customer identification for a shopping store, the respondent may misconstrue the request and inadvertently disclose a piece of sensitive information like their government identification security number. This unintentional leakage of sensitive data can lead to substantial privacy and security concerns. One solution may be to simply mask or censor responses containing potentially sensitive information; however, this may not work in instances where the caller is indeed a trusted entity, and the exchange of such information is necessary. Therefore, the challenge lies in distinguishing these cases and taking the necessary preventive measures. This complex problem can be broken down into a series of analytic steps, which may include understanding the probability of a potential sensitive or personally sensitive information leak, checking if the user is on the verge of disclosing such information, and subsequently informing and warning the user about the potential risks of sharing sensitive and confidential information.

The present disclosure addresses the deficiencies described above by providing a process (as well as a system, method, machine-readable medium, etc.) that enables the proactive identification and prevention of sensitive information exposure in telephonic conversations. This novel process safeguards confidentiality of sensitive information through vigilance and prevention, irrespective of whether the user's disclosure of information is intentional or inadvertent.

The illustrative embodiments provide for identification and prevention of sensitive information exposure in telephonic conversations. "Sensitive information," as used herein, may refer to any data that, if exposed, could result in a breach of security or privacy. Sensitive information can be categorized into two main types: security information and personal information. Security information may refer to any data that, if disclosed, could compromise the security of a system, network, or device. Examples of security information include, but are not limited to, passwords, encryption keys, security tokens, or access codes. This information may serve as a form of authentication or access control, and unauthorized disclosure could lead to security breaches such as unauthorized system access or data theft. Personal information, also known as personally identifiable information (PII), may refer to any data that can be used to identify an individual either directly or when combined with other information. Examples of personally identifiable information include names, social security numbers, financial data including bank account or credit card numbers, birth dates, addresses, phone numbers, and email addresses. Unauthorized exposure of personally identifiable information could lead to privacy breaches, identity theft, or financial fraud.

A "telephonic conversation." as used herein, may refer to any voice-based interaction that occurs between two or more parties over telephone. For example, a Caller A may engage in a telephonic conversation with a Caller B via communication of their respective telephones with the intent of discussing the activation of an offer from the organization Caller A represents.

Identification of sensitive information may involve detecting and/or flagging data within a conversation that is deemed to be sensitive or confidential, as disclosed herein. For instance, when a caller asks for information related to a credit card number during a telephonic conversation, the present system may identify the credit card number as sensitive information.

Prevention of sensitive information exposure may involve a series of measures designed to stop the inadvertent or deliberate sharing of sensitive information during a call, as disclosed herein. This could include, for example, a system that translates a receiver's spoken response to text, analyzes the text for potential sensitive information, and then warns the receiver before the information is shared.

Illustrative embodiments include converting voice data to text data. "Voice data," as used herein, may refer to auditory content or spoken information during a telephone interaction. This data may represent the spoken words or phrases, along with other aspects of human speech such as tone and pitch. As an example, data transferred between a customer service representative (caller) and a customer (receiver) discussing the activation of a service during a telephonic conversation may constitute voice data.

"Text data," as used herein, may refer to a textual representation of the voice data. It may encompass, for instance, the transcribed dialogues from the phone conversation, effectively converting spoken language into a structured written format. As an example, when the customer service representative asks for customer details, their spoken request, when transcribed, may result in text data.

Converting voice data to text data may involve use of any suitable voice transcription technology, such as automatic speech recognition (ASR) and natural language processing (NLP). Automatic speech recognition technologies may transcribe spoken language into written text by analyzing audio signals, such as by applying machine learning algorithms to recognize and translate the speech patterns. Natural language processing is a branch of artificial intelligence that allows computers to understand, interpret, and manipulate human language. This technology may allow the system to understand context, detect sentiment, extract key details, and generate human-like responses. Natural language processing technologies may achieve these results by applying computational linguistics and/or machine learning algorithms to audio or text, enabling them to recognize patterns and derive meaning.

In some embodiments, converting voice data to text data may be performed by a voice-to-text converter. A "voice-to-text converter," as used herein, may refer to a module of the system configured to transform spoken words into a textual format. This converter may transcribe the audio data from the telephonic conversation, and it may leverage speech processing technologies such as automatic speech recognition and natural language processing. For instance, when a user converses with a customer service representative, the voice-to-text converter could transcribe their dialogues. If the user says, "My card number is 1234 5678 9012 3456," the voice-to-text converter may process these spoken words and produce a corresponding written text.

Illustrative embodiments include use of an extractor. An "extractor," as used herein, may refer to a module of the system that parses text data and extracts meaningful components, such as intents and entities. This module may utilize techniques such as tokenization, lemmatization, part-of-speech tagging, and dependency parsing to break down and interpret the text data. For instance, the extractor may employ natural language processing, named entity parsing, dependency parsing, part-of-speech tagging, semantic role labeling, machine learning, or any other text processing algorithm.

Illustrative embodiments include extracting an intent from text data. An "intent," as used herein, may refer to an action or response that the caller seeks from the receiver. For example, a request like "Can you give me your address?" may signify an intent to obtain the receiver's address. Extracting an intent from text data may involve using text processing techniques to identify key verbs or action words in the text data that signify a request or action by the caller. In some embodiments, an intent may be extracted by the extractor.

Illustrative embodiments include extracting an entity from text data. An "entity," as used herein, may refer to the data or object being discussed in a telephonic conversation. An entity could range from specific data such as a person's name, an address, or a credit card number, to more general categories of information. Extracting an entity from text data may involve parsing the transcribed text to identify nouns or noun phrases that correspond to specific items of interest. This could involve using text processing techniques such as named entity recognition (NER), which can identify and categorize entities into predefined classes like "person." "location," "organization," etc. In some embodiments, an entity may be extracted by the extractor.

Illustrative embodiments include use of a predictor. A "predictor," as used herein, may refer to a module that determines whether a potential response could reveal sensitive information. For example, if the identified intent is to inquire about bank details, the predictor could anticipate potential sensitive responses such as account numbers or security codes. This module may apply techniques such as machine learning algorithms, deep learning models, sequence tagging models, semantic analysis methods, anomaly detection techniques, natural language processing libraries, or reinforcement learning algorithms. These techniques may aid the predictor in understanding the context and potential sensitive aspects in the conversation, thereby foreseeing possible sensitive responses. For example, if the identified intent in the conversation is to inquire about bank details, the predictor, leveraging these techniques, could anticipate potential sensitive responses such as account numbers or security codes, and take necessary actions to prevent unauthorized disclosure.

Illustrative embodiments include predicting sensitive information. Predicting sensitive information may involve leveraging the predictor module to analyze and match the identified intent and entities with the receiver's potential responses. This could involve creating a probability model that assesses how likely each potential response is to contain sensitive information.

For example, in some embodiments, predicting sensitive information may be based on an intent and an entity. As an instance, the predictor may extract, from the text data, an intent in the form of an action (verb) and an entity in the form of a subject (noun) of the communication. Consider na scenario where the identified intent in a conversation is "to share," and the entity is "credit card number." In this context, the predictor, considering these factors, could anticipate that potential responses may include sensitive information such as the actual credit card number. In this context, the predictor may employ a range of techniques and technologies, such as machine learning algorithms, deep learning models, sequence tagging models, semantic analysis methods, anomaly detection techniques, natural language processing libraries, and reinforcement learning algorithms.

Illustrative embodiments include use of an intersector. An "intersector," as used herein, may refer to a module of the system configured to examine text data for potential matches with the predicted sensitive information, and initiating a preventive measure to prevent any inadvertent exposure. For instance, the intersector may employ one or more matching algorithms to not only identify exact matches but also instances where the sensitive information in the text data may not be an exact match with predicted sensitive information, which may be similar enough to warrant attention. Depending on this determination, the intersector may allow the transmission of the audio data if no sensitive information is found, or initiate necessary actions if sensitive information is detected. These actions could include preventing the transmission of the associated audio data, triggering a warning to the speaker, requesting a speaker agreement, or any other suitable action. For example, in a scenario where the text data includes sensitive information, the intersector may intersect the voice data. This process may involve isolating and preventing the transmission of the segments of the voice data corresponding to the sensitive information detected in the text data.

Illustrative embodiments include comparing text data to predicted sensitive information, and determining whether the text data includes the sensitive information. Comparing text data to predicted sensitive information may involve employing technologies such as pattern matching algorithms, text similarity measures, fuzzy matching techniques, vector space models, hashing techniques, and machine learning models. These technologies may enable the system to analyze the text data at a granular level, identifying nuanced instances of potential sensitive information exposure. Text similarity measures and fuzzy matching techniques like Levenshtein distance or cosine similarity can handle situations where the sensitive information in the text data may not be an exact match with the pre-defined list, but is similar enough to raise a flag. Pattern matching algorithms can look for exact occurrences of sensitive information in the text data. Vector space models such as bag-of-words (BoW) or term frequency-inverse document frequency (TF-IDF) can be used to convert the text into a form that can be easily compared with the predicted sensitive information. Hashing techniques can help in efficient searching of the sensitive information within the text data.

For example, if the text data is a credit card number, the system, using any combination of the technologies mentioned above, may determine that there is a match with sensitive information (in this case, the credit card number itself). In such circumstances, the system may prevent the transmission of the audio data associated with the sensitive information, initiate a warning to the speaker, ask for a speaker agreement, or take any other suitable action. Conversely, if the text data is a random number, the system may determine there is no match with any predicted sensitive information and may permit the audio data to flow through.

Illustrative embodiments include intersecting, responsive to a determination that the text data includes the sensitive information, the voice data. Intersecting voice data may include isolating portions of the voice data that are linked to potential sensitive information exposure. For example, consider the scenario where a user is having a telephonic conversation, during which they unintentionally start to disclose their credit card number. In this case, the system may transcribe the voice data into text data, and upon detecting the credit card number as sensitive information in the text data, it may trace back to the exact segment of voice data from where the card number was spoken.

In some embodiments, intersecting the voice data may include preventing a transmission of the voice data to a listener in the telephonic conversation. This intersecting operation could involve blocking the flow of the voice data to the other party involved in the telephonic conversation. Depending on the specifics of the system and network, this could involve pausing the voice data stream, muting the microphone on the user's device, replacing the sensitive segment of the audio with an obscuring sound, among other approaches. As a result, the listener on the other end of the call would not receive the sensitive information, thereby avoiding a potential disclosure of sensitive information.

For example, the system may be configured to programmatically manipulate the data stream to remove or mute the portions identified as containing sensitive information. This could be done at the network level using protocols such as Session Initiation Protocol (SIP) or Real-time Transport Protocol (RTP), which are responsible for establishing, modifying and terminating sessions with one or more participants. The system could send control messages to pause, interrupt or terminate the stream as necessary when sensitive information is detected. In another scenario where the communication is happening over a traditional telephony network, the system might have control over the telephony hardware interface and can manipulate the voice signal directly. This could involve muting the microphone or temporarily interrupting the audio data path. Furthermore, in some embodiments, the system may be integrated with the telephony service at a deeper level, allowing it to directly control the flow of voice data. This level of control might include the ability to temporarily suspend the audio feed, alter the voice stream to obscure sensitive information, or substitute the sensitive portion with an audio placeholder, such as a tone or beep.

Illustrative embodiments include generating a sensitive information warning. A "sensitive information warning." as used herein, may refer to a system-generated alert that notifies the receiver when their intended response contains potential sensitive information. For example, if the receiver intends to provide their credit card number, the system may generate an audible warning, reminding them of the potential risks.

Illustrative embodiments include generating a speaker agreement. A "speaker agreement." as used herein, may refer to the receiver's response to the sensitive information warning. It may an explicit action by the receiver to either confirm or deny their intention to share the identified sensitive information. This process may involve interacting with a user interface to signal their decision.

Illustrative embodiments include decomposing sensitive information into a key-value pair. A "key-value pair." as used herein, may refer to a data representation where a piece of sensitive information (the value) is associated with an identifier (the key). For instance, the key might be a term such as "Credit Card," and the corresponding value could be the actual card number. Identifying these keys and values can be achieved by utilizing a variety of text processing technologies such as natural language processing, information extraction, named entity recognition, and others. For example, using natural language processing, the system could parse a sentence like "My credit card number is 1234 5678 9012 3456" to identify "Credit Card" as the key and "1234 5678 9012 3456" as the value.

In some embodiments, a user may directly input key-value pairs into the system. This could be done through a secure user interface designed to handle the input of sensitive information. For instance, the user could manually enter a key, such as "Social Security Number." and its associated value, which would be their actual social security number. The system could offer appropriate safeguards such as secure sockets layer (SSL) encryption for the data entry process, ensuring the safety of user-inputted sensitive information.

Illustrative embodiments include storing the key-value pair. Storing the key-value pair may involve recording these pairs, such in a sensitive information datastore, a key-value pair datastore, or cache memory. For example, a datastore may be designed to securely store and protect general sensitive information and/or key-value pairs, utilizing a variety of security measures. These measures can include encryption techniques to safeguard data at rest and in transit, stringent access controls to prevent unauthorized access, data anonymization to mask sensitive information, and secure backup facilities to prevent data loss. Additionally or alternatively, the key-value pairs may be stored in local memory (e.g., cache memory). Key-value pairs may subsequently be retrieved through any suitable electronic transmission.

In some embodiments, predicting the sensitive information may include determining whether text data matches a key. Any suitable matching algorithm may be used, including those mentioned previously, such as pattern matching algorithms, text similarity measures, fuzzy matching techniques, vector space models, hashing techniques, and machine learning models. For instance, if a speaker in the conversation states the first four digits of a credit card number, the system may use these digits to check if they match a key in the stored key-value pairs. If there is a match found, it could be a sign that the speaker is about to disclose sensitive information, such as the complete credit card number, in the conversation.

In some embodiments, predicting the sensitive information may include determining whether text data matches an identifier. For example, if the identified entity is a "credit," the system could check if it matches with the key in the key-value pair stored in the system, which may include an array of "Credit Card," "Card Number," "Card," and "Number." By comparing the identified entity with the keys of the key-value pairs, the system can assess if there's a potential risk of sensitive information being revealed in the conversation. The system can then take necessary precautions to mitigate this risk. For instance, if the conversation involves the entity "credit card" and this matches with the key in the stored key-value pair, it may indicate a potential disclosure of the card number in the upcoming conversation segments. In such a case, the system could trigger the sensitive information warning to alert the speaker, and take necessary actions to prevent the sensitive data exposure.

Illustrative embodiments include determining a risk score associated with a telephonic conversation. A "risk score," as used herein, may refer to a calculated metric that indicates the probability of the call being fraudulent or the likelihood of sensitive information being unintentionally exposed in that call. Determining a risk score may involve incorporating multiple factors to quantify the risk associated with the call. This determination could be based on various factors such as the caller's prior call history, frequency of calls, and a call time. This process may involve, for instance, using machine learning models to analyze the caller's historical data, the caller's frequency of calls, the time of day when the call takes place, and other relevant factors. For example, frequent calls at odd hours by an unknown number may increase the risk score. This score may help in evaluating the risk associated with the call, thereby aiding in the overall prevention of sensitive information exposure.

Illustrative embodiments include generating a risk warning, responsive to a determination that the risk score meets a predetermined threshold. This warning may take the form of an audible alert, a visual signal, or both, and may serve to draw the user's attention to the elevated risk associated with the ongoing conversation. For instance, if the risk score crosses a set limit of 0.8 (on a scale of 0 to 1, with 1 being the highest risk), the system might sound an alarm or display a pop-up message to caution the user. Such proactive measures can effectively thwart potential fraud and safeguard sensitive information.

In some embodiments, the system may be activated based on a user selection. For instance, as the system may be configured to respect the privacy of its users by providing them with the control to enable or disable the system. This feature can be beneficial in case of starred or favorite conversations where the users have the liberty to ensure their privacy. This feature may create a balance between security and privacy, allowing the system to serve its purpose without encroaching upon personal conversations. For instance, in a situation where the receiver is discussing the activation of an offer with a trusted caller, they might choose to disable the system to maintain the intimacy of the conversation. In some embodiments, for example, responsive to a user selection, the system may deactivate the voice-to-text converter, the extractor, the predictor, the intersector, or any other or all components.

Users may be provided with several options to disable the system, based on the specific context. For instance, the system could incorporate a "Do Not Disturb" mode, where users can turn off monitoring for a specified duration. Additionally, users may have the ability to create a list of trusted callers, such as by favoring them or by speaking with them for a predetermined number of times or frequency. Conversations with contacts on this list, like close family members or long-time colleagues, may automatically bypass the sensitive information detection system, ensuring that personal interactions remain private and uninterrupted. Another example could be a "Sensitive Topics" option, where users define certain keywords or topics for which the system will be inactive. If a conversation involves these predetermined topics, the system's monitoring may be temporarily disabled, providing users the space to freely discuss those matters without interference. Furthermore, users might also have the opportunity to disable the system for specific channels or platforms. If a user tends to have private conversations over a certain platform, they could choose to exempt it from monitoring. For instance, one might disable the system for all WhatsApp calls, while keeping it active for other phone calls.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

The process software for identification and prevention of sensitive information exposure in telephonic conversations is integrated into a client, server and network environment, by providing for the process software to coexist with applications, operating systems and network operating systems software and then installing the process software on the clients and servers in the environment where the process software will function.

The integration process identifies any software on the clients and servers, including the network operating system where the process software will be deployed, that are required by the process software or that work in conjunction with the process software. This includes software in the network operating system that enhances a basic operating system by adding networking features. The software applications and version numbers will be identified and compared to the list of software applications and version numbers that have been tested to work with the process software. Those software applications that are missing or that do not match the correct version will be updated with those having the correct version numbers. Program instructions that pass parameters from the process software to the software applications will be checked to ensure the parameter lists match the parameter lists required by the process software. Conversely, parameters passed by the software applications to the process software will be checked to ensure the parameters match the parameters required by the process software. The client and server operating systems, including the network operating systems, will be identified and compared to the list of operating systems, version numbers and network software that have been tested to work with the process software. Those operating systems, version numbers and network software that do not match the list of tested operating systems and version numbers will be updated on the clients and servers in order to reach the required level.

After ensuring that the software, where the process software is to be deployed, is at the correct version level that has been tested to work with the process software, the integration is completed by installing the process software on the clients and servers.

With reference to FIG. 1, this figure depicts a block diagram of a computing environment 100. Computing environment 100 contains an example of an environment for the execution of at least some of the computer code involved in performing the inventive methods, such as sensitive information detector 200 for identification and prevention of sensitive information exposure in telephonic conversations. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
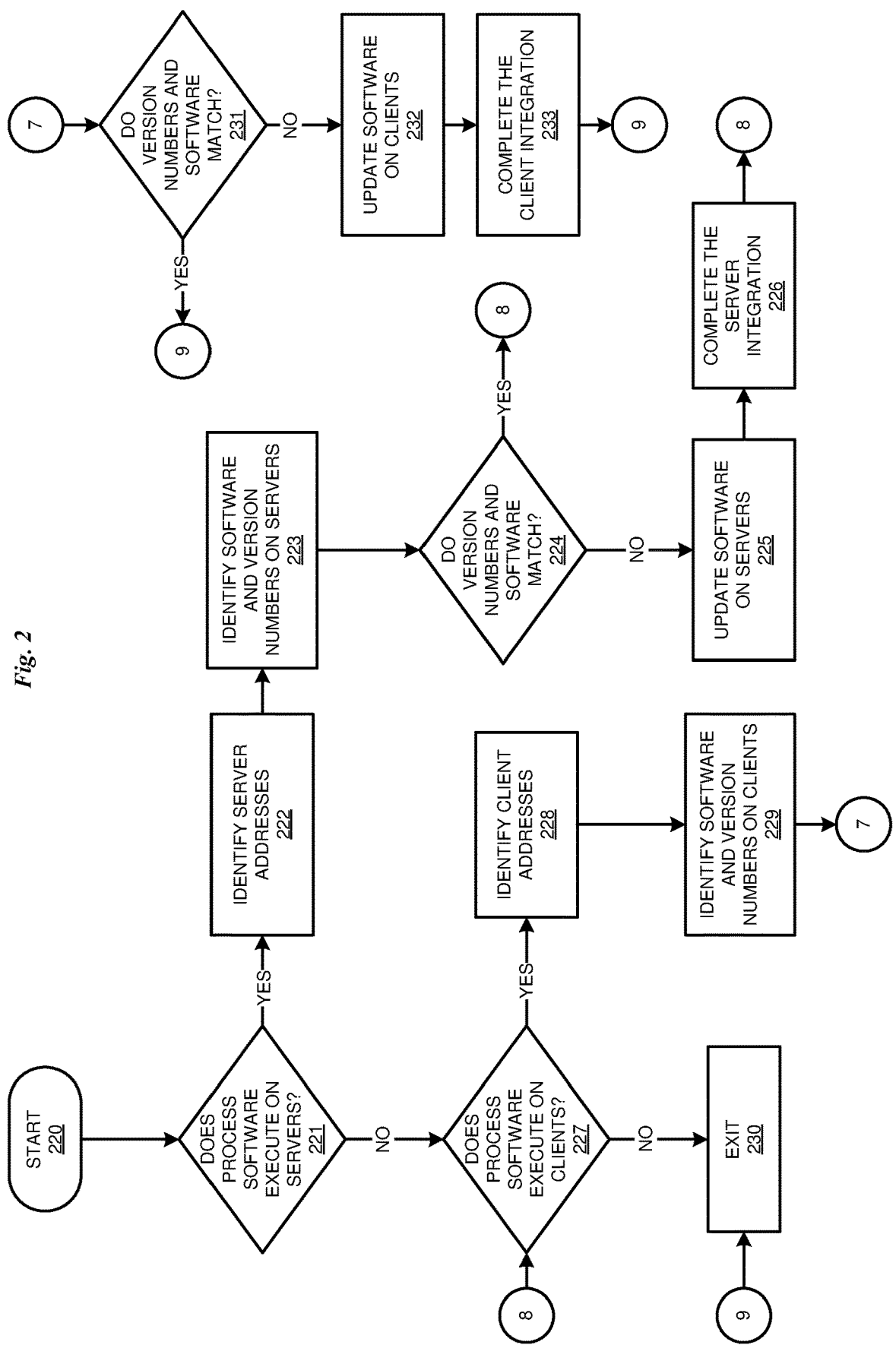
FIG. 2 depicts a block diagram of an example software integration process in accordance with an illustrative embodiment.

With reference to FIG. 2, this figure depicts a block diagram of an example software integration process, which various illustrative embodiments may implement. Step 220 begins the integration of the process software. An initial step is to determine if there are any process software programs that will execute on a server or servers (221). If this is not the case, then integration proceeds to 227. If this is the case, then the server addresses are identified (222). The servers are checked to see if they contain software that includes the operating system (OS), applications, and network operating systems (NOS), together with their version numbers that have been tested with the process software (223). The servers are also checked to determine if there is any missing software that is required by the process software (223).

A determination is made if the version numbers match the version numbers of OS, applications, and NOS that have been tested with the process software (224). If all of the versions match and there is no missing required software, the integration continues (227).

If one or more of the version numbers do not match, then the unmatched versions are updated on the server or servers with the correct versions (225). Additionally, if there is missing required software, then it is updated on the server or servers (225). The server integration is completed by installing the process software (226).

Step 227 (which follows 221, 224 or 226) determines if there are any programs of the process software that will execute on the clients. If no process software programs execute on the clients, the integration proceeds to 230 and exits. If this not the case, then the client addresses are identified (228).

The clients are checked to see if they contain software that includes the operating system (OS), applications, and network operating systems (NOS), together with their version numbers that have been tested with the process software (229). The clients are also checked to determine if there is any missing software that is required by the process software (229).

A determination is made if the version numbers match the version numbers of OS, applications, and NOS that have been tested with the process software (231). If all of the versions match and there is no missing required software, then the integration proceeds to 230 and exits.

If one or more of the version numbers do not match, then the unmatched versions are updated on the clients with the correct versions 232. In addition, if there is missing required software, then it is updated on the clients 232. The client integration is completed by installing the process software on the clients 233. The integration proceeds to 230 and exits.

Figure 3:
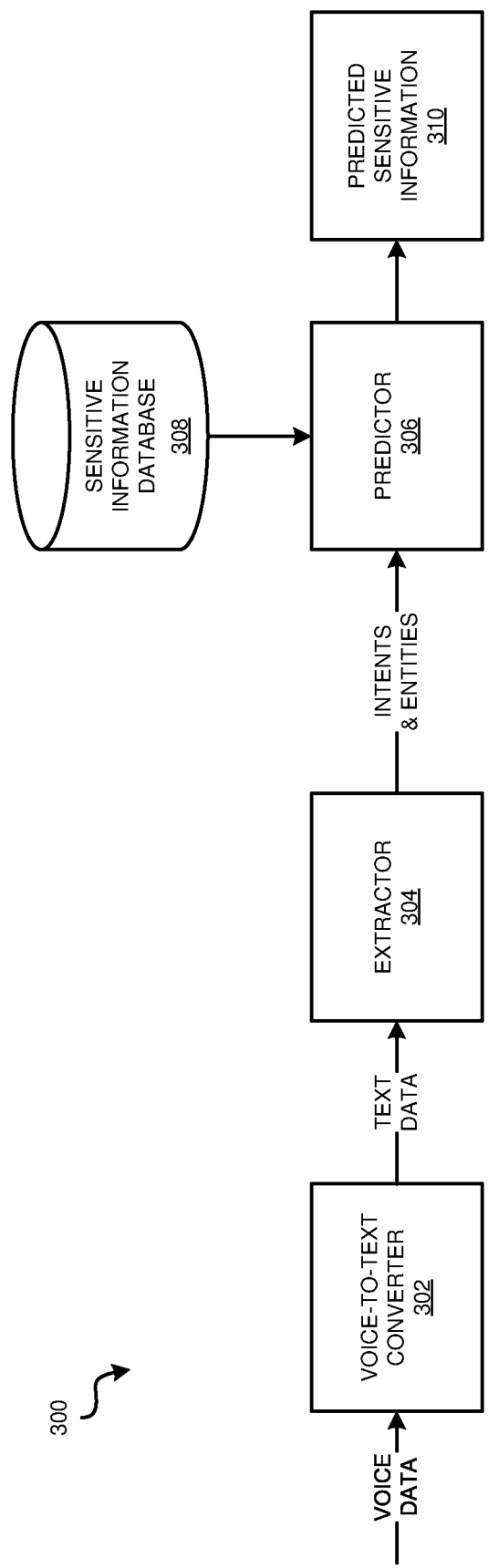
FIG. 3 depicts a block diagram of an example process for sensitive information detection in accordance with an illustrative embodiment.

With reference to FIG. 3, this figure depicts a block diagram of an example process for sensitive information detection in accordance with an illustrative embodiment 300. The example block diagram of FIG. 3 may be implemented using sensitive information detector 200 of FIG. 1.

In the illustrative embodiment, at block 302, the process may employ a voice-to-text converter to convert voice data to text data. This process may involve leveraging speech processing algorithms, such as automatic speech recognition and natural language processing technologies to render spoken language into a textual format that subsequent modules can readily process. For instance, if a speaker were to say, "Please share your card number," the voice-to-text converter may transcribe this spoken phrase into written text, which can then be dissected by the extractor module in the next block.

At block 304, the process may employ an extractor to extract intents and entities from the text data. This process may involve utilizing text processing algorithms, such as natural language processing, to process the textual information and identify key intents (such as verbs) and entities (such as nouns). In the given example, for instance, the intent could be "share" and the entity could be "card number." These extracted components may serve as the raw data that may be cross-referenced with the user-specific sensitive information stored in the sensitive information database.

At block 306, the process may employ a predictor to predict, based on the intents and entities, whether the voice data contains sensitive information. This process may involve applying text processing technologies or pre-trained machine learning models to cross-reference the intents and entities derived from the extractor with a user-specific sensitive information stored in a sensitive information database. The predictor might, for instance, recognize that "card number" corresponds to a key in the database that's associated with the actual credit card number. This realization may trigger the system to flag the potential sharing of sensitive information.

As further show, the process may use sensitive information database 308 for the prediction. This database may store the user's sensitive information in a structured format. A key-value model, for instance, may be used to store data, with keys representing the entities (along with their synonyms), and values being the actual sensitive information. For instance, the key could include an array in the form of ["Credit Card," "Card Number," "Card," "Number"], and the corresponding value might be the actual credit card number, such as "1234 5678 9012 3456." Further, in some embodiments, the sensitive information database may enable the predictor module to effectively spot potential data leaks based on historical information by decomposing sensitive information identified during use.

At block 310, the process may generate predicted sensitive information. This predicted sensitive information may contain potential sensitive responses that the receiver could give to the caller, based on the extracted intents and entities and cross-referenced with the user-specific sensitive information. The sensitive information may, for instance, generated in the form of a list. Should the receiver's response match any item on this list, the system may trigger an alarm, thereby ensuring the user is notified before sensitive data is inadvertently disclosed. For example, if the receiver starts to say the credit card number, the system may recognize this as potential sensitive information and initiate a warning.

Figure 4:
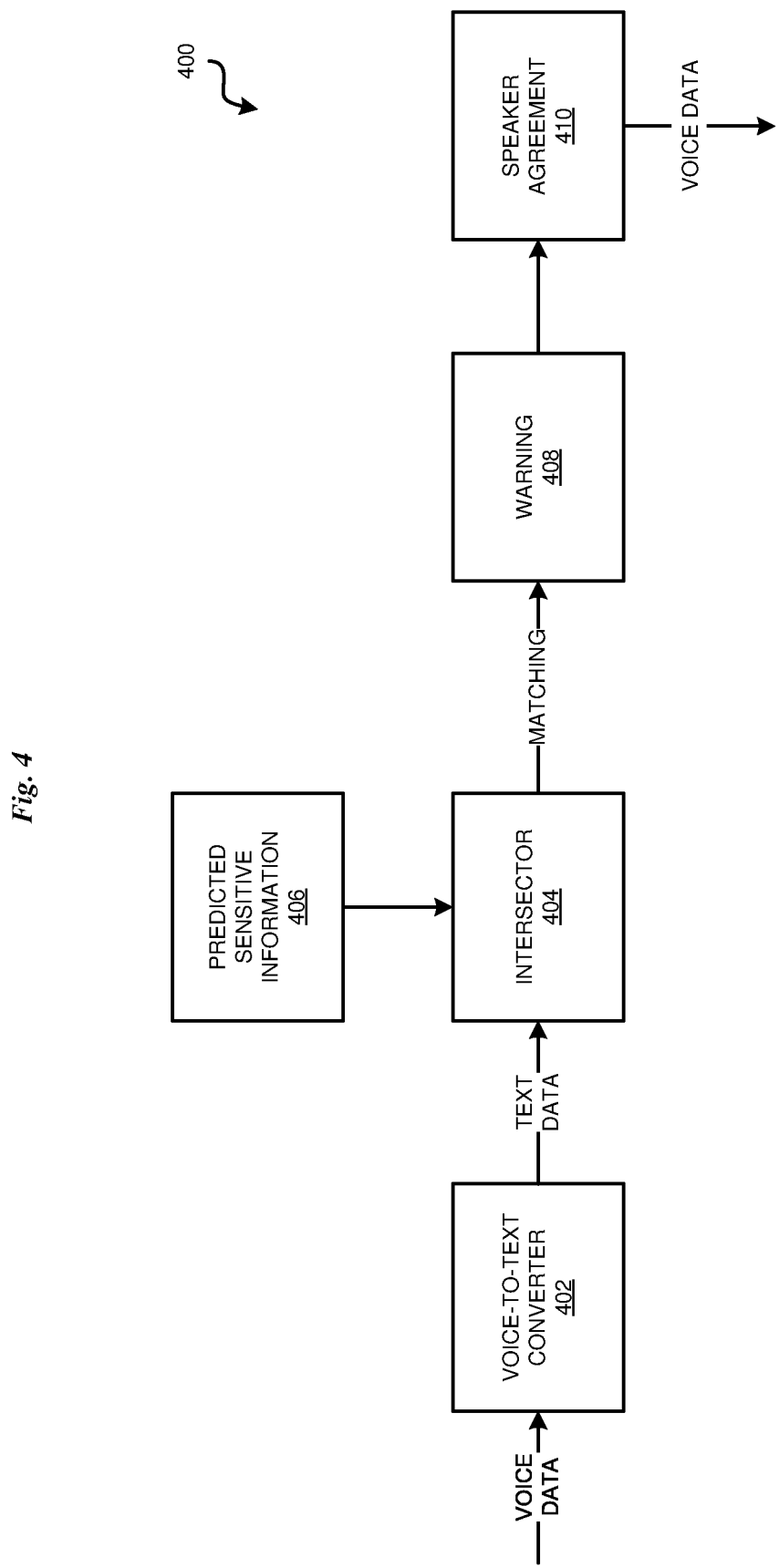
FIG. 4 depicts a block diagram of an example process for sensitive information exposure prevention in accordance with an illustrative embodiment.

With reference to FIG. 4, this figure depicts a block diagram of an example process for sensitive information exposure prevention in accordance with an illustrative embodiment 400. The example block diagram of FIG. 4 may be implemented using sensitive information detector 200 of FIG. 1.

In the illustrative embodiment, at block 402, similar to block 302 in FIG. 3, the process may utilize a voice-to-text converter to transcribe voice data into text data. This component may transform the voice data into textual format, such as by utilizing automatic speech recognition and natural language processing, as described previously.

At block 404, the process may employ an intersector to determine whether there is a match between the text data and the predicted sensitive information 406. This module may be configured to analyze the converted text data, and to perform a matching operation to compare it with the predicted sensitive information. The text interceptor may be equipped with technologies such as regex matching, fuzzy logic, and machine learning-based pattern recognition, and it may detect slight variations or oblique references to sensitive information in the text. For instance, if the user begins to utter the phrase, "Sure, my card digits are 1234," the intersector may match the term "1234" with the predicted credit card number "1234 5678 9012 3456." Additionally or alternatively, the intersector may match the term "card digits" with a list of predicted sensitive information (e.g., "card number") and recognize it as potential sensitive information.

At block 408, if the intersector determines that there is a match, the process may generate a warning. This alert may serve to notify the user about the imminent risk of disclosing sensitive information. The warning could take the form of a visual alert, an auditory signal, or a combination of both, depending on the system configuration. In the ongoing example, the system may immediately generate a warning as soon as the user begins to share the credit card number.

At block 410, the process may generate a speaker agreement. The speaker agreement may seek explicit permission from the user to share the potentially sensitive information. It might, for example, prompt the user to verbally agree or disagree to share the identified sensitive information. In the given context, if the user still decides to share the credit card number after receiving the warning, they may have to provide a clear confirmation to that effect.

Additionally, in some embodiments, the process may prevent the voice data from being transmitted altogether if the intersector determines a match with the predicted sensitive information. This intervention can effectively stop a potential data breach at its source by halting the transmission of any audio data associated with the identified sensitive information. Other actions may be taken, however, as explained previously.

Figure 5:
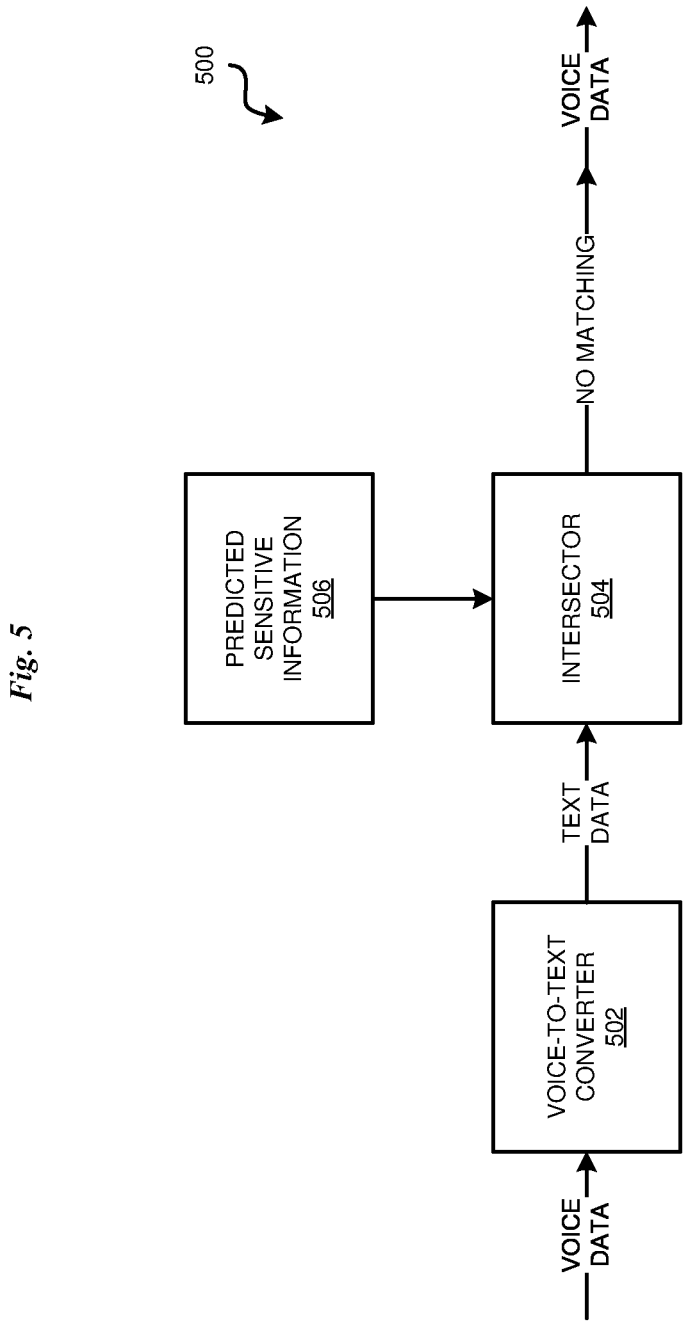
FIG. 5 depicts a block diagram of an example process for sensitive information exposure prevention in accordance with an illustrative embodiment.

With reference to FIG. 5, this figure depicts a block diagram of an example process for sensitive information exposure prevention in accordance with an illustrative embodiment 500. The example block diagram of FIG. 5 may be implemented using sensitive information detector 200 of FIG. 1.

In the illustrative embodiment, at block 502, similar to block 302 in FIG. 3, the process may utilize a voice-to-text converter to transcribe voice data into text data. This component may transform the voice data into textual format, such as by utilizing automatic speech recognition and natural language processing, as described previously.

At block 504, the process may employ an intersector to determine whether there is a match between the text data and predicted sensitive information 506, as with block 404 of FIG. 4. This module may process the transformed text data, comparing it with the predicted sensitive information, such as by using technologies like regex matching, fuzzy logic, and machine learning algorithms, as discussed previously.

The deviation in this process occurs at block 506. In this scenario, if the intersector does not identify a match between the text data and the predicted sensitive information, it may forego performing a preventive action to avoid disclosure of the voice data. It may, for instance, allow the transmission of voice data. The system may thus acknowledge that not all information shared during a conversation is sensitive, emphasizing its capability to discern non-sensitive data accurately. For instance, if the user were to say, "Oh, that number on my shopping store card is 5678," the intersector, recognizing that neither "number on my shopping store card" nor "5679" matches the predicted sensitive information, may allow the transmission without triggering any alert or speaker agreement. This intelligent, context-drive understanding may enhance the system's usability while maintaining a high standard of data security.

Figure 6:
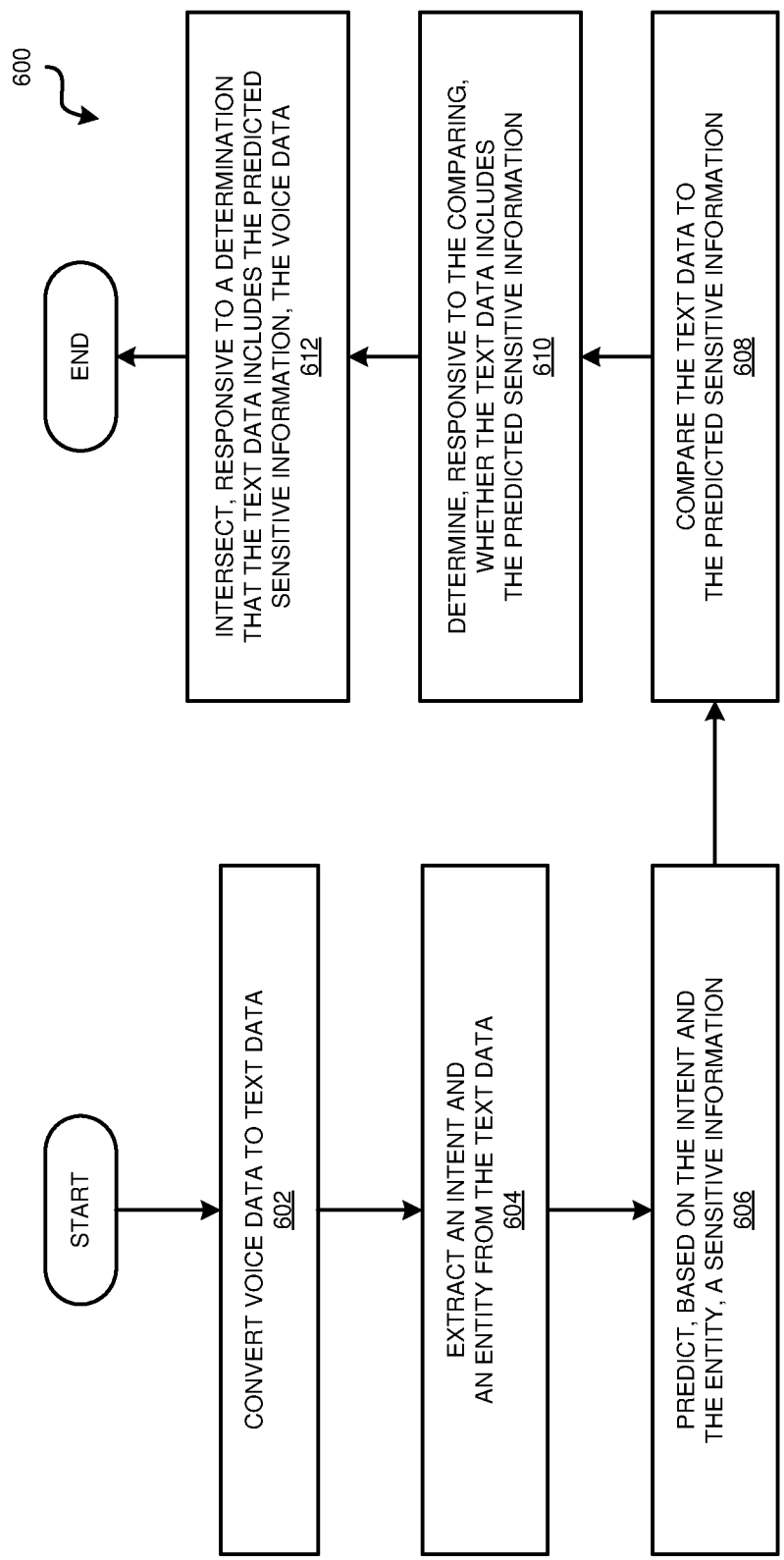
FIG. 6 depicts a block diagram of an example process for identification and prevention of sensitive information exposure in telephonic conversations in accordance with an illustrative embodiment.

With reference to FIG. 6, this figure depicts a block diagram of an example process for identification and prevention of sensitive information exposure in telephonic conversations in accordance with an illustrative embodiment 600. The example block diagram of FIG. 6 may be implemented using sensitive information detector 200 of FIG. 1.

In the illustrative embodiment, at block 602, the process may convert voice data to text data. At block 604, the process may extract an intent and an entity from the text data. At block 606, the process may predict, based on the intent and the entity, a sensitive information. At block 608, the process may compare the text data to the predicted sensitive information. At block 610, the process may determine, responsive to the comparing, whether the text data includes the predicted sensitive information. At block 612, the process may intersect, responsive to a determination that the text data includes the predicted sensitive information, the voice data.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
   converting to text data in real-time, by a voice-to-text converter, voice data of a conversation occurring in real-time between a first party and a second party;
   extracting, by an extractor, an intent and an entity from the text data, wherein the intent comprises a request by the first party to the second party, and wherein the entity comprises a category of information being requested;
   predicting, by a predictor, based on the request and the category of information being requested, a sensitive information that is likely to be disclosed in the real-time conversation;
   comparing, by an intersector, the text data in real-time to the predicted sensitive information;
   determining, by the intersector, responsive to the comparing, whether the text data includes the predicted sensitive information; and
   intersecting, by the intersector, responsive to a determination that the text data includes the predicted sensitive information, the voice data.

2. The method of claim 1, wherein the voice data is associated with a speaker of a telephonic conversation, further comprising:
   intersecting the voice data includes preventing a transmission of the voice data to a listener in the telephonic conversation.

3. The method of claim 1, further comprising:
   retrieving a key corresponding to an identifier associated with the sensitive information, and a value corresponding to the sensitive information; and
   predicting the sensitive information by determining whether the text data matches at least one of the key or the value.

4. The method of claim 3, further comprising:
   decomposing the predicted sensitive information into a key-value pair; and
   storing the key-value pair.

5. The method of claim 1, further comprising generating a sensitive information warning.

6. The method of claim 1, further comprising generating a speaker agreement.

7. The method of claim 1, further comprising:
   determining a risk score associated with a telephonic conversation; and
   generating a risk warning, responsive to a determination that the risk score meets a predetermined threshold.

8. The method of claim 7, wherein the risk score is based on at least one of a call history, a call frequency, and a call time.

9. The method of claim 1, further comprising:
   deactivating, responsive to a user selection, at least one of the voice-to-text converter, the extractor, the predictor, and the intersector.

10. The method of claim 1, further comprising:
    comparing the entity to a key in a first key-value pair, wherein the entity is extracted from a first portion of voice data;
    anticipating, responsive to the entity matching the key, that a potential voice response to the first portion of the voice data has a likelihood of including a first sensitive information corresponding to the first key-value pair; and
    causing, responsive to the anticipating, a manipulation of a communication channel carrying the voice data.

11. The method of claim 1, further comprising:
    comparing a first portion of the text data with a first key-value pair;
    anticipating, responsive to the first portion of the text data at least partially matching a portion of the first key-value pair, that an upcoming portion of the voice data has a likelihood of including a first sensitive information corresponding to the first key-value pair; and causing a response to the anticipation, a manipulation of a communication channel carrying voice data.

12. A computer program product comprising one or more computer readable storage media, and program instructions collectively stored on the one or more computer readable storage media, the program instructions executable by a processor to cause the processor to perform operations comprising:
   converting to text data in real-time, by a voice-to-text converter, voice data of a conversation occurring in real-time between a first party and a second party;
   extracting, by an extractor, an intent and an entity from the text data, wherein the intent comprises a request by the first party to the second party, and wherein the entity comprises a category of information being requested;
   predicting, by a predictor, based on the request and the category of information being requested, a sensitive information that is likely to be disclosed in the real-time conversation;
   comparing, by an intersector, the text data in real-time to the predicted sensitive information;
   determining, by the intersector, responsive to the comparing, whether the text data includes the predicted sensitive information; and
   intersecting, by the intersector, responsive to a determination that the text data includes the predicted sensitive information, the voice data.

13. The computer program product of claim 12, wherein the voice data is associated with a speaker of a telephonic conversation, further comprising:
   intersecting the voice data includes preventing a transmission of the voice data to a listener in the telephonic conversation.

14. The computer program product of claim 12, further comprising:
   retrieving a key corresponding to an identifier associated with the sensitive information, and a value corresponding to the sensitive information; and
   predicting the sensitive information by determining whether the text data matches at least one of the key or the value.

15. The computer program product of claim 14, further comprising:
   decomposing the predicted sensitive information into a key-value pair; and
   storing the key-value pair.

16. The computer program product of claim 12, further comprising generating a sensitive information warning.

17. The computer program product of claim 12, further comprising generating a speaker agreement.

18. A computer system comprising a processor and one or more computer readable storage media, and program instructions collectively stored on the one or more computer readable storage media, the program instructions executable by the processor to cause the processor to perform operations comprising:
   converting to text data in real-time, by a voice-to-text converter, voice data of a conversation occurring in real-time between a first party and a second party;
   extracting, by an extractor, an intent and an entity from the text data, wherein the intent comprises a request by the first party to the second party, and wherein the entity comprises a category of information being requested;
   predicting, by a predictor, based on the request and the category of information being requested, a sensitive information that is likely to be disclosed in the real-time conversation;
   comparing, by an intersector, the text data in real-time to the predicted sensitive information;
   determining, by the intersector, responsive to the comparing, whether the text data includes the predicted sensitive information; and
   intersecting, by the intersector, responsive to a determination that the text data includes the predicted sensitive information, the voice data.

19. The computer system of claim 18, wherein the voice data is associated with a speaker of a telephonic conversation, further comprising:
   intersecting the voice data includes preventing a transmission of the voice data to a listener in the telephonic conversation.

20. The computer system of claim 18, further comprising:
   retrieving a key corresponding to an identifier associated with the sensitive information, and a value corresponding to the sensitive information; and
   predicting the sensitive information by determining whether the text data matches at least one of the key or the value.

* * * * *